(12) United States Patent
Braun (10) Patent No.: US 9,273,840 B1
(45) Date of Patent: Mar. 1, 2016

(54) INTEGRATED ILLUMINATION SYSTEM (71) Applicant: Marlin Braun, Eagan, MN (US)

(72) Inventor: Marlin Braun, Eagan, MN (US)

(*) Notice: Subject to any disclaimer, the term of this patent is extended or adjusted under 35 U.S.C. 154(b) by 0 days.

(21) Appl. No.: 14/210,156

(22) Filed: Mar. 13, 2014

Related U.S. Application Data (60) Provisional application No. 61/779,754, filed on Mar. 13, 2013.

(51) Int. Cl.
| | | |
|---|---|---|
| *H05B 37/02* | (2006.01) | |
| *F21S 9/03* | (2006.01) | |
| *F21V 23/04* | (2006.01) | |
| *F21S 8/00* | (2006.01) | |

(52) U.S. Cl.
CPC ............... *F21S 9/035* (2013.01); *F21S 8/033* (2013.01); *F21V 23/04* (2013.01); *H05B 37/02* (2013.01)

(58) Field of Classification Search
CPC ...................................................... H05B 37/02
USPC ................. 315/86, 149–159, 291, 297, 307
See application file for complete search history.

(56) References Cited

U.S. PATENT DOCUMENTS

| | | | |
|---|---|---|---|
| 4,182,960 | A | 1/1980 | Reuyl |
| 4,200,904 | A | 4/1980 | Doan |
| 4,281,369 | A | 7/1981 | Batte |
| 4,294,038 | A | 10/1981 | Davidson |
| 4,314,198 | A | 2/1982 | Rogers |
| 4,384,317 | A | 5/1983 | Stackpole |
| 4,410,930 | A | 10/1983 | Yachabach |
| 4,515,150 | A | 5/1985 | McGlew et al. |
| 4,519,657 | A | 5/1985 | Jensen |
| 4,644,256 | A | 2/1987 | Farias et al. |
| 4,835,664 | A | 5/1989 | Wen |
| 4,841,416 | A | 6/1989 | Doss |
| 4,884,017 | A | 11/1989 | Williams |
| 5,029,342 | A | 7/1991 | Stein et al. |
| 5,062,028 | A | 10/1991 | Frost et al. |
| 5,149,188 | A | 9/1992 | Robbins |
| 5,221,363 | A | 6/1993 | Gillard |
| 5,262,756 | A | 11/1993 | Chien |

(Continued)

FOREIGN PATENT DOCUMENTS

| | | |
|---|---|---|
| EP | 2003393 A1 | 12/2008 |
| EP | 2017525 A1 | 1/2009 |

OTHER PUBLICATIONS

"Transparency", ertexsolar, (Accessed 2014), 2 pgs.

(Continued)

*Primary Examiner* — Tung X Le
(74) *Attorney, Agent, or Firm* — Schwegman Lundberg & Woessner, P.A.

(57) ABSTRACT

An integrated illumination system can comprise a combination of components configured to collect, convert, and store solar energy as electrical energy and subsequently convert the electrical energy into visible light. The integrated illumination system can be suitable for installation into or onto a building structure as a convenient, standalone 'plug-and-play' package. The integrated illumination system can include control strategies to manage various aspects of the system's "user interface" (e.g., color, color temperature such as 'warmth' of emitted light, system efficiency, etc.). The control strategies can manage aspects of the integrated illumination system that can be specified, monitored, controlled, and packaged/customized for an application and/or environment.

13 Claims, 11 Drawing Sheets

(56) References Cited

U.S. PATENT DOCUMENTS

| | | |
|---|---|---|
| 5,364,710 A | 11/1994 | Hikita |
| 5,413,161 A | 5/1995 | Corazzini |
| 5,618,100 A | 4/1997 | Glynn |
| 5,692,647 A | 12/1997 | Brodie |
| 5,909,061 A | 6/1999 | Sasaki et al. |
| 5,924,784 A | 7/1999 | Chliwnyj et al. |
| 6,027,225 A | 2/2000 | Martin et al. |
| 6,037,758 A | 3/2000 | Perez |
| 6,081,104 A | 6/2000 | Kern |
| 6,107,941 A | 8/2000 | Jones |
| 6,268,559 B1 | 7/2001 | Yamawaki |
| 6,292,901 B1 | 9/2001 | Lys et al. |
| 6,646,196 B2 | 11/2003 | Fronek et al. |
| 6,674,255 B2 | 1/2004 | Schnebly et al. |
| 6,768,047 B2 | 7/2004 | Chang et al. |
| 6,784,357 B1 | 8/2004 | Wang |
| 6,952,165 B2 | 10/2005 | Kovach et al. |
| 7,057,821 B2 | 6/2006 | Zincone |
| 7,190,531 B2 | 3/2007 | Dyson et al. |
| 7,231,128 B2 | 6/2007 | Muhs et al. |
| 7,455,435 B2 | 11/2008 | Mathews et al. |
| 7,550,931 B2 | 6/2009 | Lys et al. |
| 7,602,157 B2 | 10/2009 | Babcock et al. |
| 7,766,511 B2 | 8/2010 | Zampini et al. |
| 7,784,992 B2 | 8/2010 | Gustaveson |
| 7,828,463 B1 | 11/2010 | Willis |
| 7,834,580 B2 | 11/2010 | Haines |
| 7,845,126 B2 | 12/2010 | Brescia |
| 7,845,127 B2 | 12/2010 | Brescia |
| 7,845,128 B2 | 12/2010 | Brescia |
| 7,847,181 B2 | 12/2010 | Brescia |
| 7,874,716 B2 | 1/2011 | Lai et al. |
| 7,965,049 B2 | 6/2011 | Chou |
| 7,972,048 B1 | 7/2011 | Lamborn |
| 7,973,235 B2 | 7/2011 | Muhs et al. |
| 8,013,237 B2 | 9/2011 | Li |
| 8,013,566 B2 | 9/2011 | Haines |
| 8,040,102 B2 | 10/2011 | Kao et al. |
| 8,044,539 B2 | 10/2011 | Pan |
| 8,171,679 B2 | 5/2012 | Brescia et al. |
| 8,171,680 B2 | 5/2012 | Brescia |
| 8,205,386 B2 | 6/2012 | Konstantin |
| 8,251,535 B2 | 8/2012 | Anderson |
| 8,277,072 B2 | 10/2012 | Chen et al. |
| 8,280,558 B2 | 10/2012 | Picco |
| 8,313,224 B2 | 11/2012 | Moyer |
| 8,333,041 B2 | 12/2012 | Brescia |
| 8,337,039 B1 | 12/2012 | Larkin |
| 8,348,453 B2 | 1/2013 | Cumberland et al. |
| 8,381,465 B2 | 2/2013 | Brescia et al. |
| 8,567,141 B2 | 10/2013 | Logan |
| 8,575,470 B2 | 11/2013 | Dehlsen et al. |
| 8,643,028 B2 | 2/2014 | Ban et al. |
| 2003/0156012 A1 | 8/2003 | Omidi et al. |
| 2004/0093809 A1 | 5/2004 | Winarski |
| 2007/0052385 A1 | 3/2007 | Fan |
| 2007/0165835 A1 | 7/2007 | Berkman |
| 2007/0287389 A1 | 12/2007 | Pockat et al. |
| 2008/0163918 A1 | 7/2008 | Li |
| 2008/0272278 A1 | 11/2008 | Shewa et al. |
| 2009/0040750 A1 | 2/2009 | Myer |
| 2009/0059574 A1 | 3/2009 | Lewis et al. |
| 2009/0195653 A1 | 8/2009 | Miao |
| 2010/0029268 A1 | 2/2010 | Myer |
| 2010/0065834 A1 | 3/2010 | Hammond |
| 2010/0292815 A1* | 11/2010 | Pan .................................. 700/90 |
| 2011/0007498 A1 | 1/2011 | Maier |
| 2011/0007500 A1 | 1/2011 | Gustaveson |
| 2011/0018448 A1* | 1/2011 | Metchear et al. ............. 315/152 |
| 2011/0089839 A1 | 4/2011 | Chen et al. |
| 2011/0170283 A1* | 7/2011 | Chan ............................ 362/183 |
| 2011/0228520 A1 | 9/2011 | Cumberland |
| 2011/0265851 A1 | 11/2011 | Berezhnyy et al. |
| 2011/0266971 A1 | 11/2011 | Osborn |
| 2012/0011782 A1 | 1/2012 | Kolas et al. |
| 2012/0113623 A1 | 5/2012 | Weber |
| 2012/0120643 A1 | 5/2012 | Meng et al. |
| 2012/0167951 A1 | 7/2012 | Maeda et al. |
| 2012/0182725 A1 | 7/2012 | King |
| 2012/0317900 A1 | 12/2012 | Den Boer et al. |
| 2013/0003346 A1 | 1/2013 | Letoquin et al. |
| 2013/0061542 A1 | 3/2013 | Weidner |
| 2013/0100675 A1 | 4/2013 | Han et al. |
| 2013/0169189 A1* | 7/2013 | Bernard ............. H05B 37/0272 315/307 |
| 2013/0329404 A1 | 12/2013 | Larkin |
| 2014/0003038 A1 | 1/2014 | Kim et al. |
| 2014/0020312 A1 | 1/2014 | Seiling et al. |
| 2014/0021903 A1 | 1/2014 | Seiling |
| 2014/0117871 A1* | 5/2014 | Swatsky ............. H05B 37/0272 315/246 |

OTHER PUBLICATIONS

Cambala, Petr, et al., "Power Balance of Photovoltaic Generators", [Online]. Retrieved from the Internet: <URL: http://www.feec.vutbr.cz/EEICT/2003/fsbornik/03-PGS/04-Power_Electrical_Engineering/03-cambala_petr.pdf>, (2003), 5 pgs.

* cited by examiner

INTEGRATED ILLUMINATION SYSTEM

CLAIM OF PRIORITY

This patent application claims the benefit of priority under 35 U.S.C. §119(e) of Braun U.S. Provisional Patent Application Ser. No. 61/779,754, entitled "Integrated Illumination System," filed on Mar. 13, 2013, which is hereby incorporated by reference herein in its entirety.

TECHNICAL FIELD

This patent document pertains to a combination system of solar energy collection, illumination, energy storage and module controller components.

BACKGROUND

Photovoltaic modular panels have been integrated into curtain wall glass for building integrated photovoltaics, as discussed in U.S. Publication Serial No. 200810163918.

U.S. Pat. No. 8,251,535 (Anderson) discusses an LED lighting assembly comprising an LED mounted to a support, a solar element for creating electric power from solar power, a wind vane for creating electrical power from wind power, a battery for storing generated electricity, a light detector controlling operation of the LED, and a system controller.

U.S. Pat. No. 8,280,558 (Picco) discloses a computerized light control system with light level profiling.

SUMMARY

The present inventor recognizes, among other things, it can be desirable to integrate photovoltaic devices, which produce direct current, and systems into commercial, industrial and residential buildings. Other approaches may be generally restricted to roof-top based systems, which have limited photovoltaic capability due to the finite area presented by roof tops and minimal aesthetic appeal. Roof-top based systems may also depend upon racking systems, which may not afford a practical method to integrate photovoltaic elements into a vertical building face in an attractive and safe manner. Further, shading by building elements, equipment, and other constraints may severely limit the area available for photovoltaic deployment.

A first aspect of this disclosure can relate to a combination of components to create an integrated illumination system that can collect, convert and store solar energy as electrical energy and subsequently convert said electrical energy into visible light that is uniquely suitable for installation into a building structure as a standalone, convenient 'plug-and-play' package.

Another aspect of this disclosure can relate to a combination of components as a fully integrated, standalone package such as can be easily transported to remote locations to provide 'plug-and-play', off-grid primary lighting or emergency back-up lighting such as for remote and non-remote environments.

Another aspect of the disclosure can relate to a combination of components to create an integrated illumination system that can use energy collected primarily from solar energy, but can have the option to use energy from standard electric utilities such as to supply reliable illumination such as for commercial, industrial and residential applications.

Another aspect of the disclosure concerns illumination system control strategies to manage various aspects of the system's inward-facing "user interface" (e.g., color, color temperature such as 'warmth' of emitted light, system efficiency, etc.), where the user interface can permit access or control of those aspects of the disclosed illumination system that can be specified, monitored, controlled and packaged/customized for an application and environment.

Another aspect of the disclosure concerns illumination system control strategies that can be used to manage various aspects of the system's outward-facing "user interface" including color, efficiency, transparency-allowing day lighting features, as well as other aesthetic and practical characteristics.

Other aspects of the disclosure will be apparent to those skilled in the art from the disclosure that follows.

It will be understood from the Detailed Description, below, that the present subject matter can be implemented in a multitude of different sizes, shapes, fit and function embodiments. Furthermore, it will be readily appreciated by skilled artisans that such different embodiments can include one or more of the aforementioned aspects or objects. Thus, the absence of one or more of such characteristics in any particular embodiment should not be construed as limiting. While described in the context of a power generating array within a building façade, it will be apparent to those skilled in the art that the present disclosure could be used in a number of varying applications.

DETAILED DESCRIPTION

Systems, methods and apparatuses for integrating electronic components and subsystems into a unit for lighting applications that can operate independently from utility electric grid energy sources are disclosed herein.

Figure 1:
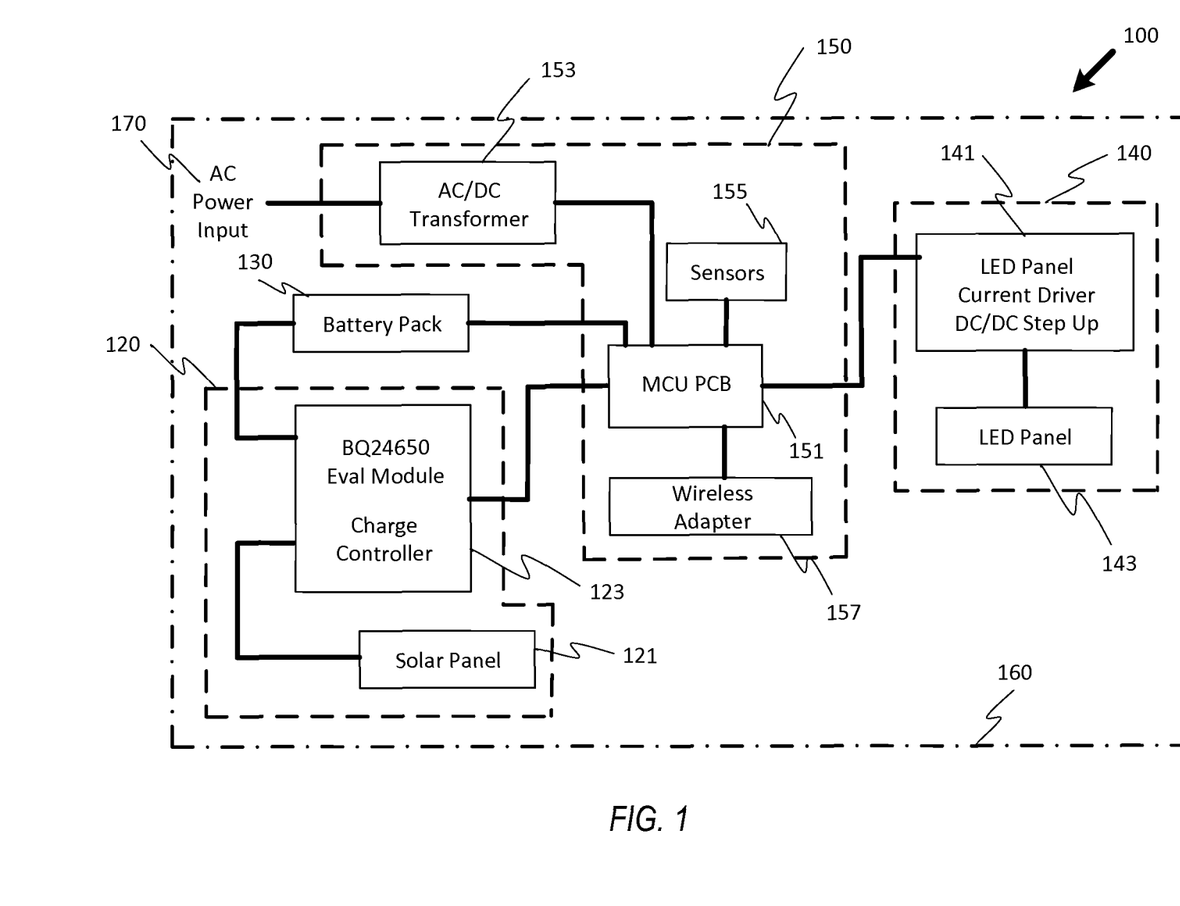
FIG. 1 is a schematic of an integrated illumination system, or IIS.

FIG. 1 shows an embodiment of an integrated illumination system (or IIS), such as can include an integrated light energy collection and artificial lighting apparatus. The IIS 100 can include a photovoltaic (or PV) module 120 to convert solar energy into electrical energy, an energy storage unit 130 to accumulate the electrical energy created by the PV module 120, a lighting module 140 to convert electrical energy into visible light, a module controller 150 to coordinate operation and power management of the IIS, and packaging hardware, a frame or mount 160 on which to locate the aforementioned components. The IIS 100 can operate with direct current (DC) power drawn from the energy storage unit 130 and can include an AC power input 170 in the module controller 150 should function of the energy storage unit 130 deviate from defined parameters.

PV Module

The PV module 120 can comprise a solar panel 121 to collect and convert solar energy into electrical current connected to a charge controller 123 that can regulate power flow to the energy storage unit 130. Examples of this disclosure can use suitable photovoltaic collection technologies. Many different commercially available solar panel packages can be used including, but not limited to, those commercially available from First Solar, Inc. located in Tempe, Ariz. In an example, the solar panel 121 can be a single continuous solar cell or a single continuous panel of solar cells. In an example a panel can be composed of smaller groupings of solar cells. The size of panels can be configured to address specific applications and building installation requirements, while the color of the panels can be selected based on aesthetic preferences and efficiency requirements. In an example, the solar panel 121 can use concentrators (e.g., mirrors, lens, etc.) to direct incident solar radiation to the solar cell, thereby increasing energy density. In an example, the solar panel 121 can incorporate light intensity sensors with automated angle optimization to tilt the solar panel (0-90 degrees vertically) to optimize solar energy collection. In an example, the solar cell 121 can comprise Si wafer based technologies; polycrystalline, monocrystalline, or ribbon based silicon. In an example, the efficiency of the solar panel 121 can be thin film based technologies; with compounds in the III and V columns of the periodic chart such as gallium arsenide, indium gallium arsenide and other similar compounds. In yet other thin film embodiments, CIS/CIGS, amorphous Si, microcrystalline Si, and CdTe can be used. Additionally, examples can incorporate organic solar cell technologies; dye-sensitized, organic, and hybrid technologies. Semi-transparent double and triple glazed insulating solar panels can be utilized in different technologies, colors, thickness, size and transparency to match applications and design intent.

Structures using opaque surfaces for wall and roof construction can provide improved radiation absorption capabilities to limit or prevent intrusion of incident radiation into a structure. In an example, opaque surfaces can insulate a structure from intrusion of infrared radiation to limit temperature changes within the structure. In an example, the solar panel 121 can be opaque to prevent light from passing through the solar panel 121 and impinging on interior surfaces. In an example, the solar panel 121 can be substantially opaque to prevent most light from passing through the solar panel 121. Opaque surfaces can provide improved reflection capabilities to redirect incident radiation from a structure or towards another structure. In an example from above, a reflective surface with an opaque coating surface, such as a mirror, can concentrate incident light to improve the efficiency of solar cells.

Examples of this disclosure can use suitable battery charge controller technologies. Many different commercially available constant current/constant voltage solar charge controllers can be used including, but not limited to, those commercially available from Texas Instruments Incorporated located in Dallas, Tex.

Energy Storage Unit

The energy storage unit 130 provides a medium to receive and store DC power from the PV module 120 and then discharge DC power to energize components of this disclosure. Examples of this disclosure can use suitable energy storage technologies. Many different commercially available battery technologies can be used including, but not limited to, those commercially available from Quallion, LLC located in Sylmar, Calif. In an example, the energy storage means 130 is a battery. In an example, the battery can employ Nickel Cadmium (NiCd) technologies or Nickel Metal Hydride (NiMH) technologies which greatly improve energy storage density as compared to NiCd technologies. In an example, the battery can employ lithium ion-based configurations including, Li—S, Li metal-polymer, Li(TM)O$_2$—C, and LiFePO$_4$—C technologies. In an example, the battery can employ digital quantum battery technology. In an example flow batteries can include Zn—Cl, Zn—Br or NaS technologies. In an example, capacitive storage technologies can be used. Many different commercially available capacitive technologies can be used including, but not limited to, those commercially available from Maxwell Technologies, Incorporated located in San Diego, Calif.

Lighting Panel

The lighting module 140 can convert electrical power into visible light and can comprise a current driver 141 to regulate power flowing to a lighting element 143. Examples of this disclosure can use suitable current driver technologies. Many different commercially available current driver technologies can be used including, but not limited to, those commercially available from Atmel Corporation located in San Jose, Calif. In an example, the current driver can use an AC/DC or DC/DC configuration.

Various embodiments of this disclosure can use suitable illumination technologies. Many different commercially available illumination LED technologies can be used including, but not limited to, those commercially available from Samsung Electronics Company, Limited located in Seoul, South Korea. In an example, the lighting element 143 can use LED technology in the form of stripes, fluorescent tubes, down-lights, light bulbs, light modules, panel lights or 'wall washers'.

In an example, the lighting element 143 can use light diffusers to achieve more uniform light emission. In an example, lighting elements 143 can be configured into a linear array and integrated together with a diffuser material to improve illumination performance while minimizing power consumption. In another embodiment, colored LEDs can be utilized varying in color (i.e.; red, green, blue, yellow or variations) and power requirements to customize interior lighting for an aesthetic effect. LED panels can be created utilizing different technologies, colors, and size to match applications and design intent.

Module Controller

The module controller 150 can coordinate IIS 100 system operation and control. The module controller 150 can comprise a master control unit (or MCU) 151, a transformer module 153 to convert AC power to DC power, one or more sensors 155 to monitor various module or operating environment parameters and a communications interface 157 allowing incorporation of IIS 100 into larger illumination system infrastructures.

Various embodiments of this disclosure can use suitable master control unit technologies to manage, control and optimize IIS 100 performance. Many different commercially available microcontroller technologies can be used including, but not limited to, those commercially available from Microchip Technology Incorporated located in Chandler, Ariz. In an example, the MCU 151 is a microcontroller of a proprietary design.

Various embodiments of this disclosure can use suitable electric power transformer technologies. Many different commercially available transformer technologies can be used including, but not limited to, those commercially available from TESLA located in Irvine, Calif. In an example, switched mode transformers can be used.

Various embodiments of this disclosure can use suitable sensor technologies to monitor IIS 100 performance. Many different commercially available light sensor and motion detection sensors can be used including, but not limited to, those commercially available from Diodes Incorporated located in Plano, Tex. and Honeywell International Incorporated located in Morristown, N.J. respectively.

Figure 2:
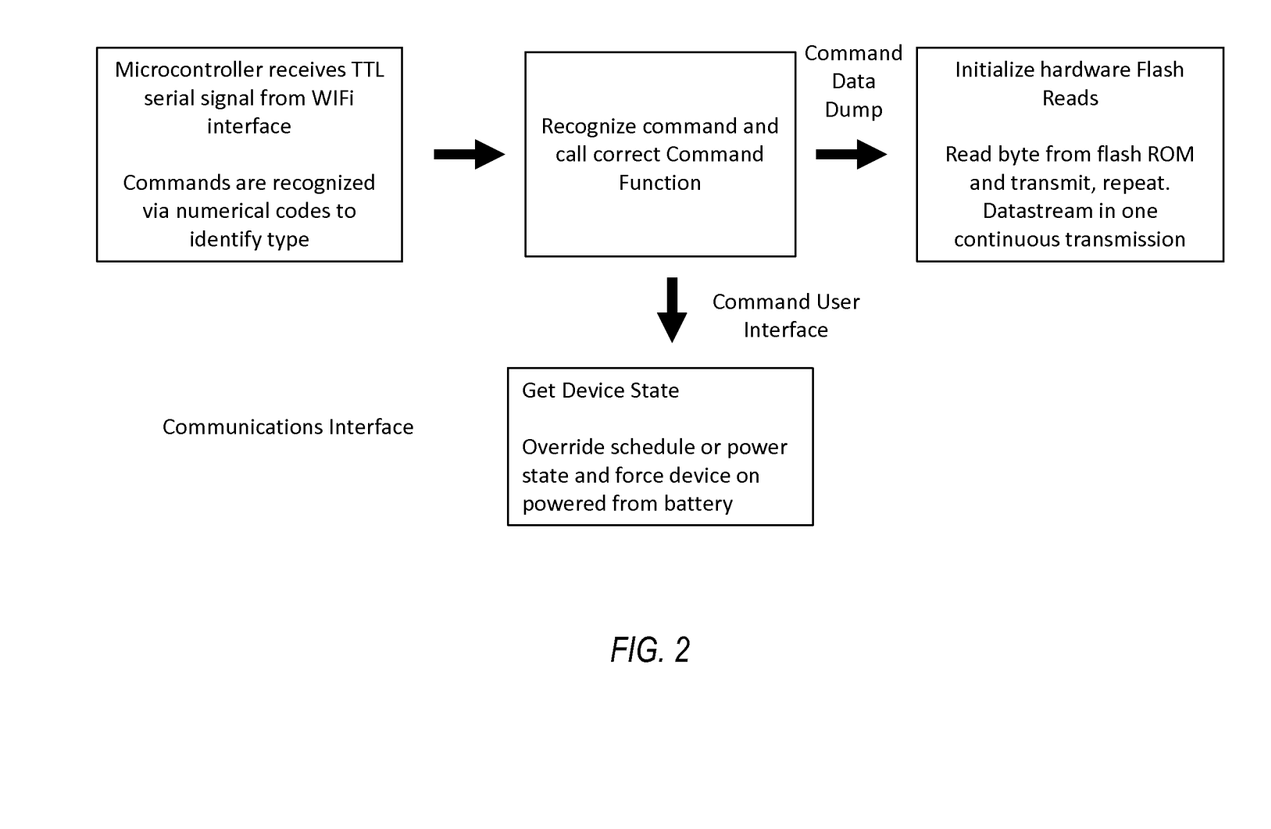
FIG. 2 is an illustration of an embodiment of an IIS communications interface.

Various embodiments of this disclosure can use suitable communication technologies to connect an IIS 100 to external systems. Many different commercially available industrial communication technologies can be used including, but not limited to, those commercially available from Siemens Aktiengesellschaft located in Munich, Germany. In an example, the communications interface 157 is based on wireless local area networking standards including, but not limited to, 802.11 standards (Wi-Fi). In an example, interface 157 is based on hardwired communication approaches including, but not limited to, RS-485 networking standards. FIG. 2 shows an illustration of an embodiment of a communication interface to extract data from a remote device.

The module controller 150 can include multiple functions. In one embodiment, the controller 150 monitors parameters of the energy storage unit 130 and switches IIS 100 power selection between battery and grid operational power modes. In another embodiment, the controller 150 creates a data log of IIS 100 monitored parameters including, but not limited to, on/off times of selected IIS 100 components, battery voltage, solar panel voltage and other IIS 100 fault conditions. In an example, the controller 150 interfaces through the communications interface 157 with other appropriate systems including, but not limited to, building illumination head end controllers. In an example, the controller 150 controls individual IIS 100 functionality including, but not limited to, lighting element 143 intensity and color temperature. In an example, the controller 150 controls a group of IIS 100 defined by a specified criteria (i.e., room-level, floor-level, public spaces, etc) based upon commands from a head end controller or individual IIS 100 sensors 155 or from a combination of individual IIS 100 sensors 155.

Battery/Grid Power Selection

The IIS 100 can operate in two operational power modes, a battery mode and a grid mode. In battery mode, electrical power accumulated in the energy storage unit 130 can be directed through the MCU 151 to the lighting module 140 to energize the current driver 141, which supplies power to the lighting element 143. In grid mode, the transformer module 153 can convert AC power supplied by a remote power source, such as a local power utility, to DC power. The power can then be directed through the MCU 151 to the lighting module 140 to energize the current driver, which supplies power to the lighting element 143. The MCU 151 can select an appropriate operational power mode for different IIS 100 operating conditions based upon real-time software algorithms that compare user-defined operational parameters to IIS 100 parameters monitored and/or measured during system operation and thereafter generate the appropriate electrical connections through a switching means including, but not limited to, a MOSFET transistor.

Figure 3:
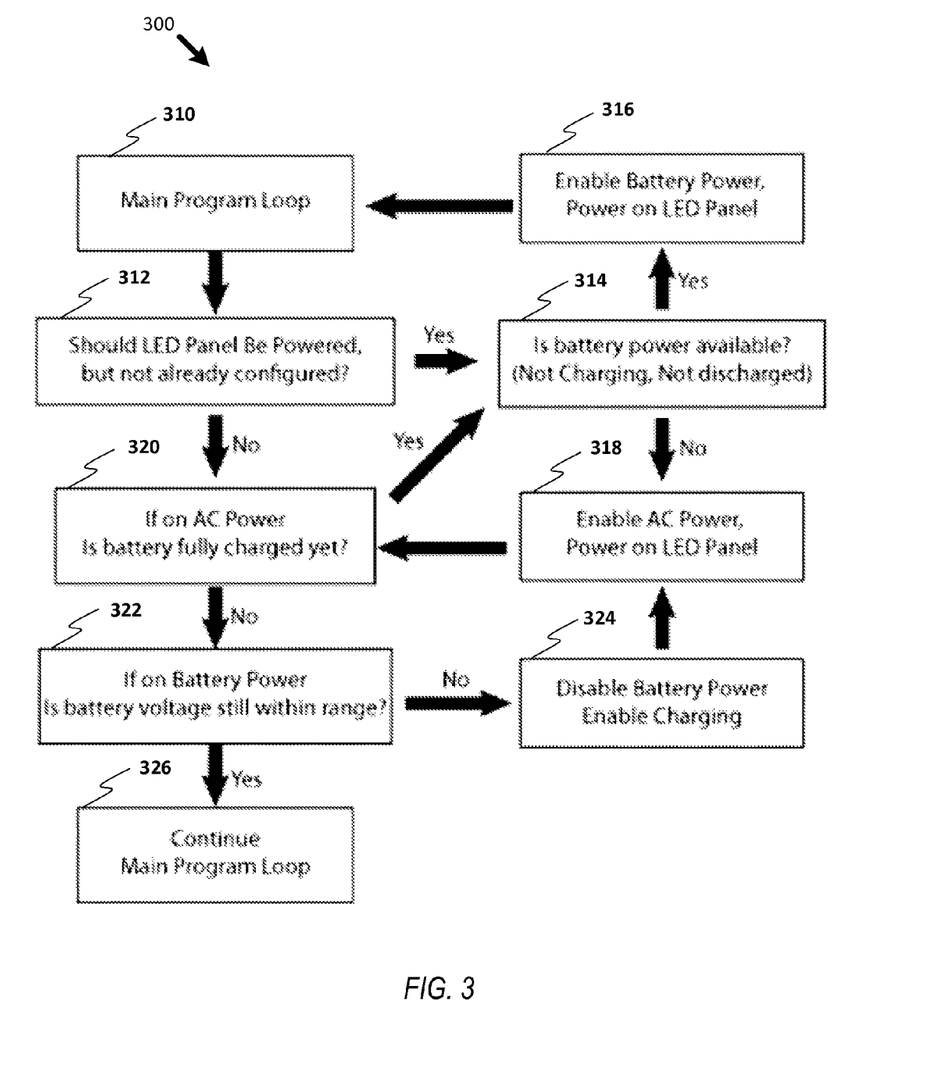
FIG. 3 is an illustration of an embodiment of an IIS power management switching logic.

FIG. 3 is an illustration showing example steps of an embodiment for switching between battery mode and grid mode operation of the IIS 100 that can be programmed into the MCU 151. When the IIS 100 is started, the microcontroller in the MCU 151 can initiate a control algorithm 300. The microcontroller can be specified with a suitable update clock rate balancing the frequency required for a specific application with the power demand from the energy storage unit 130. Initiation of control algorithm 300 can begin with initiation of Main Program Loop 310, which executes the series of steps listed in FIG. 3 until an interrupt (or stop) command is issued.

Step 312 determines if the lighting module 140 requires power (e.g., if the lighting element 143 is "on" or "off") and the current operational power mode (e.g., battery or grid) of the IIS 100. If the current operational power mode is 'battery', the control algorithm 300 moves to Step 314. If the current operational power mode is 'grid', the control algorithm 300 moves to Step 320.

Step 314 determines if the energy storage unit 130 can deliver sufficient electrical power to energize the lighting module 140 by comparing user-defined operational parameters indicative of battery power including, but not limited to, voltage with measured or calculated quantities including, but not limited to, output from sensors 155 attached to or remote from the IIS 100. In an example, the user-defined operational parameters are established so as to maximize the operational life of the energy storage unit 130. If the values of measured or calculated quantities fall within the user-defined operational parameters of 314, the control algorithm 300 moves to step 316. If the values of measured or calculated quantities do not fall within the user-defined operational parameters of 314, the control algorithm 300 proceeds to step 318.

Step 316 enables the battery operational power mode and applies electrical power from the energy storage unit 130 to the lighting module 140. The control algorithm 300 then proceeds to the main program loop 310.

Step 318 enables the grid operational power mode and applies electrical power from the transformer module 153 to the lighting module 140. The control algorithm 300 then proceeds to step 320.

Step 320 first determines the current operational power mode of the IIS 100. If the current operational power mode is 'battery', the algorithm 300 proceeds to step 322. If the current operational power mode is 'grid', the operational state of the energy storage unit 130 is determined by comparing user-defined operational parameters including, but not limited to, the total charge of the energy storage unit 130 as disclosed in this embodiment with measured or calculated quantities including, but not limited to, output from sensors 155 attached to or remote from the IIS 100. If the values of measured or calculated quantities fall within the user-defined operational parameters of step 320, the control algorithm 300 then determines if adequate battery power is available as described in step 314. If the values of measured or calculated quantities do not fall within the user-defined operational parameters of step 320, the control algorithm 300 moves to step 322.

Step 322 first determines the current operational power mode of the IIS 100. If the current operational power mode is 'grid', the algorithm 300 proceeds to step 324. If the current operational power mode is 'grid', the operational state of the energy storage unit 130 is determined by comparing user-defined operational parameters, which can include, but are not limited to, the voltage of the energy storage unit 130 as disclosed in this embodiment with measured or calculated quantities including, but not limited to, output from sensors 155 attached or remote from the IIS 100. If the values of measured or calculated quantities fall within the user-defined operational parameters of 322, the control algorithm 300 moves to step 326 and the control algorithm loops to step 310. If the values of measured or calculated quantities do not fall within the user-defined operational parameters of 322, the control algorithm 300 moves to step 324.

Step 324 switches operational power mode from 'battery' to 'grid' to disconnect the energy storage unit 130 from the lighting module 140 and allow the energy storage unit 130 to accumulate power from the PV module 120. The control algorithm 300 then moves to step 318.

Data Logging Functionality

Figure 4:
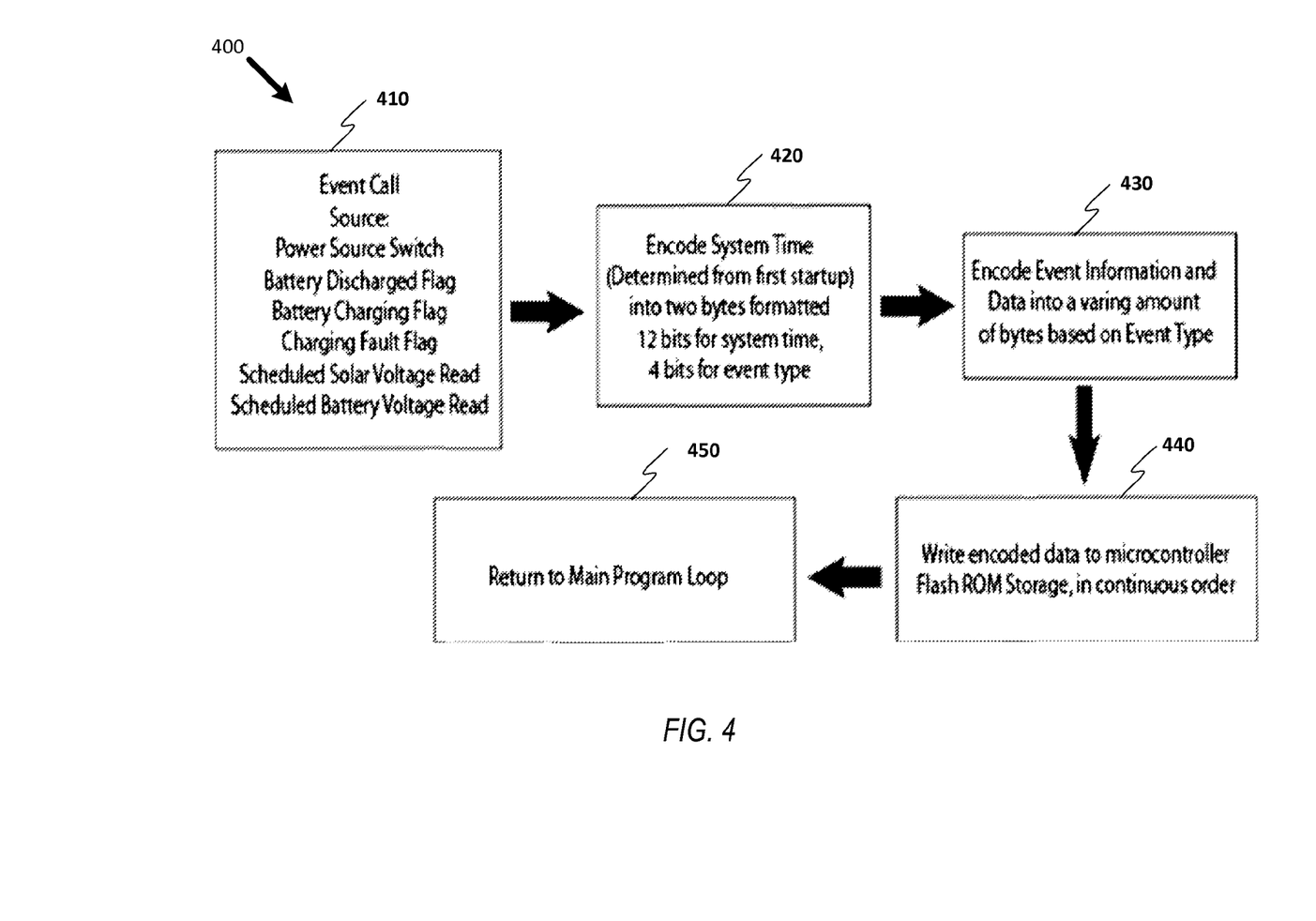
FIG. 4 is an illustration of an embodiment of an IIS data logging logic.

FIG. 4 is a flow chart showing the example steps of an embodiment for data logging functions of IIS 100 operational parameters that can be programmed into the MCU 151. The IIS 100 operational parameters can include, but are not limited to, power source switching, battery charging/discharging/fault events, and solar cell/battery voltage monitoring. The data logging function can be implemented by a microcontroller subroutine initiated by a polling flag indicating a change in logic state.

Step 410 shows the MCU 151 generating a polling flag to an 'event call source', or a signal to initiate data logging.

Step 420 establishes a collection time whereby data can be collected from the sensor of interest. The time associated with data logging includes, but is not limited to, issue of the event call source and collection of the sensor data.

Step 430 establishes a type and a value for the data logged and associates it with the collection time of Step 420. Data can be directly sampled from sensors attached to or remote from the IIS 100 or algorithms applied to create user defined quantities incorporating data from two or more sensors. Sampled data can be stored in the MCU 151 volatile memory.

Step 440 can pass the sampled data from volatile memory to flash ROM (or read only memory) storage in the order it was sampled.

Step 450 directs the data logging subroutine to return to the main program loop.

Ambient Light Intensity in the Room

In one embodiment, the ambient light within the room can be monitored via an adjustable angle photo sensor 155 aimed at a location within the room.

Figure 5:
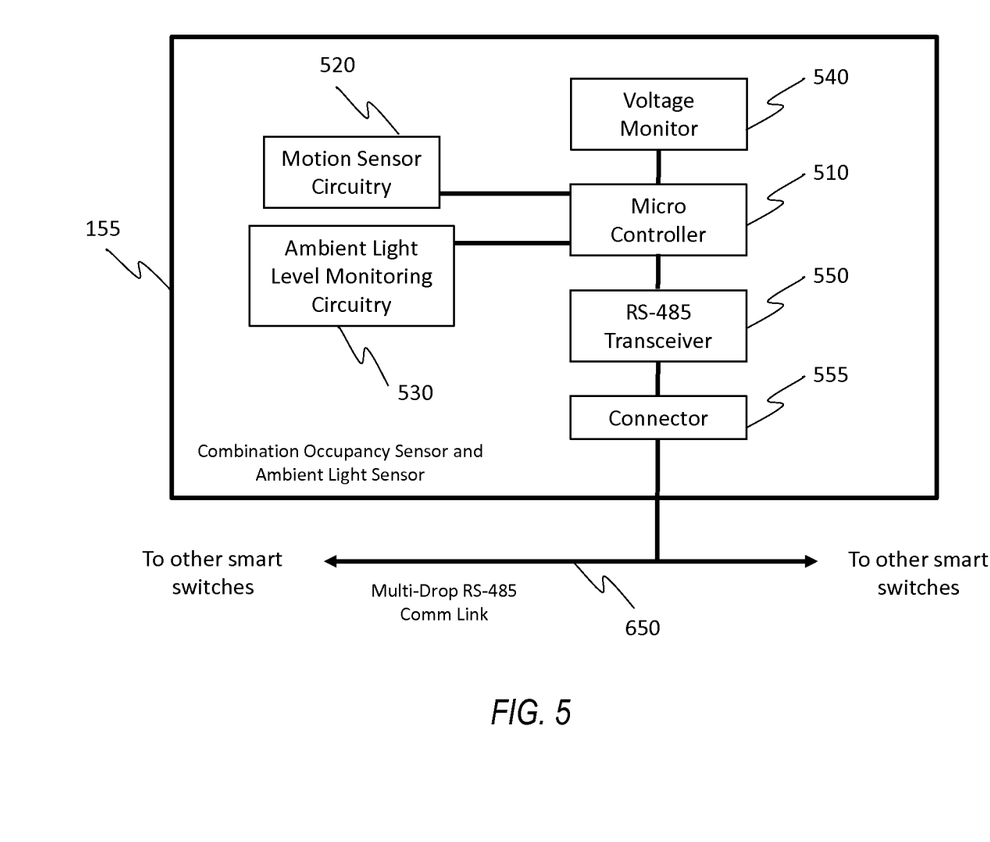
FIG. 5 is a schematic of a sensor for ambient light/motion detection.
Figure 6:
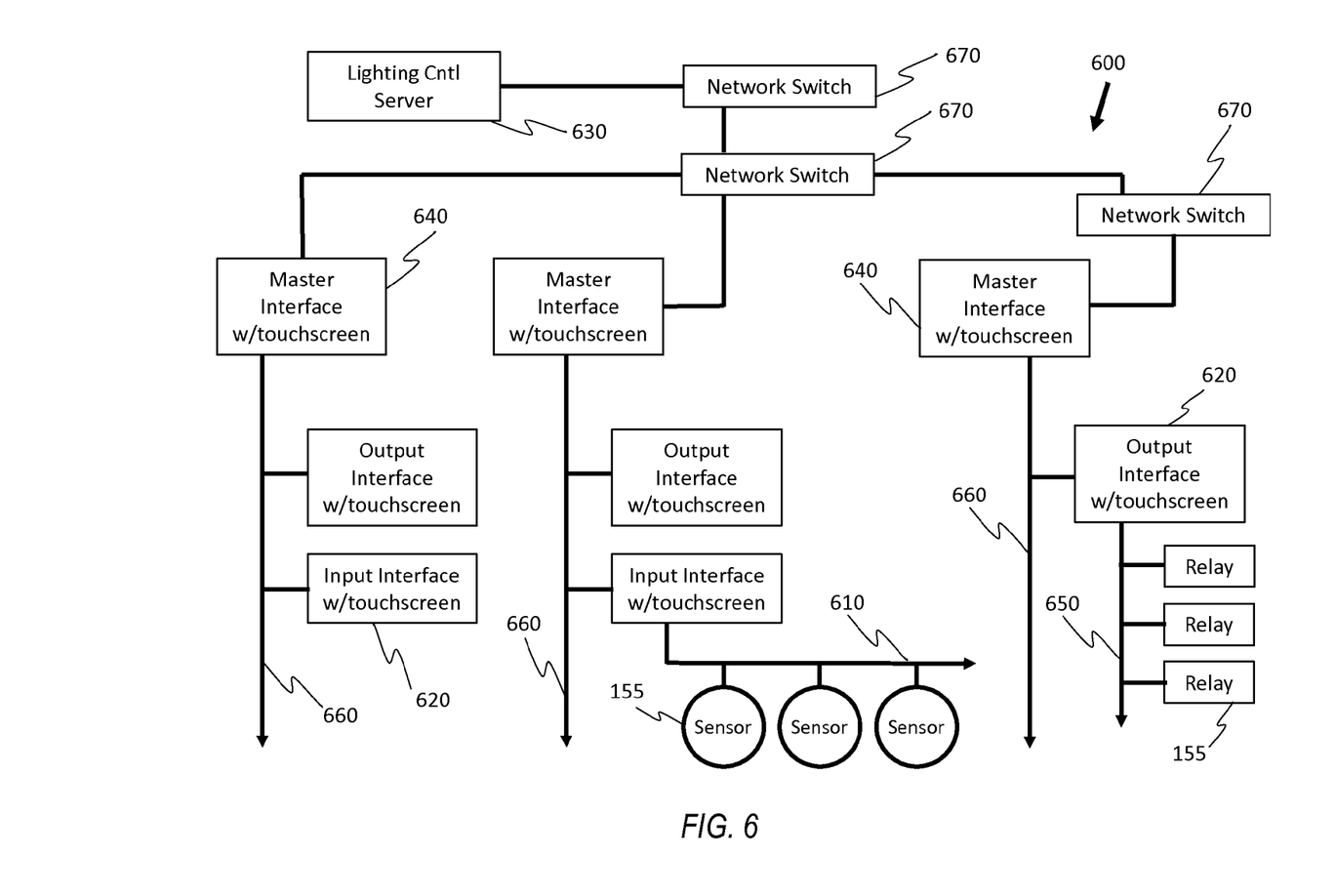
FIG. 6 is a schematic of an illumination lighting system.

The occupancy/ambient light sensor input devices 155 can monitor the environment in a particular zone within or around a building for light level and motion. FIG. 5 shows an embodiment where the occupancy/ambient light sensor 155 may include a local microcontroller 510 coupled to an occupancy/motion sensor 520 and to an ambient light sensor 530. FIG. 6 shows an embodiment of an entire lighting system control system 600 where FIG. 5 (see 155 in FIG. 6) is a subcomponent of the larger system 600. Microcontroller 510 may be coupled to a voltage monitor 540. Microcontroller 510 may also be coupled to a communications device or communications interface, such as via a RS-485 transceiver 550, and a connector 555 to the RS-485 multi-drop secondary communication link 610 leading to its controlling input occupancy/ambient light interface 620.

The occupancy sensor 520 can monitor motion in a given zone/area. The ambient light sensor 530 can monitor the ambient light level in the zone/area. In one embodiment, the ambient light sensor 530 can include three levels of sensitivity. Depending on the level of light in the monitored area, the sensor 530 can automatically adjust its sensitivity to best represent the light level. By way of example, if the light sensor 530 is placed in an area with a high level of natural ambient light (i.e., the area has a lot of windows and sky lights), it can automatically reduce its sensitivity setting to maximize the full scale of light level for that area. As more fully discussed herein below, light sensor 530 can be calibrated via a self-calibration procedure such that, as the level of artificial lighting changes in the monitored area (i.e., as the control system 600 changes the light level from low to medium by turning on additional relays/lights in a given area) so will the sensor 530 modify its representation of the ambient light in that area.

Each occupancy/ambient light sensor microcontroller 510 can be responsible for monitoring the light sensor 530 and accurately determining the ambient light level for the zone where it is located, and for monitoring the occupancy sensor 520 and determining whether motion has been sensed in that same area. Additionally, the microcontroller 510 can forward this status information to its controlling input occupancy/ambient light interface 620. Because the occupancy/ambient light sensor input devices 155 can control their own functions yet communicate with the lighting control server 630, the "on-time," also known as the "time delay," after motion is recognized can be easily adjustable. More specifically, device 155 can start a timer after motion is sensed in the area. After a specified amount of time has passed (e.g., 30 minutes) and after not receiving any other motion indications within that specified amount of time, device 155, in combination with the input interface 620 and master interface 640, can send a command to the control server 630 to turn the lights off in the controlled area. Additionally, the "on-time" or "time delay" can be sent to the device 155 microcontroller 510 via the communication network, namely, through secondary link 650, input interface 620, primary link 660, master interface 640 and Ethernet link 670, and then stored by microcontroller 510. As can be appreciated, the user can thereby easily set and change, as may be needed or desired, the "on-time" or "delay time" of the input device 155 directly from the central lighting control server 630.

Figure 7A:
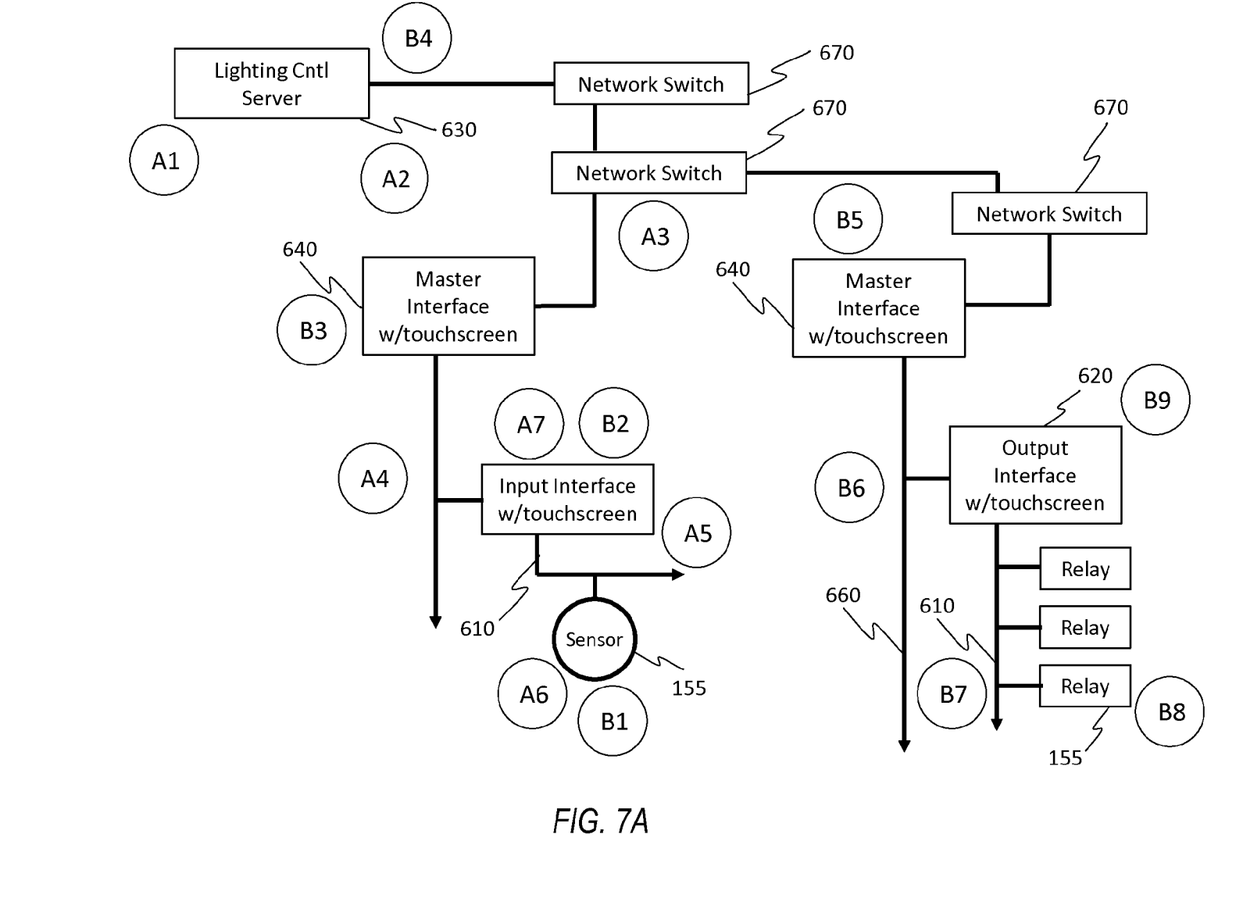
FIG. 7A is a schematic of an illumination system.
Figure 7B:
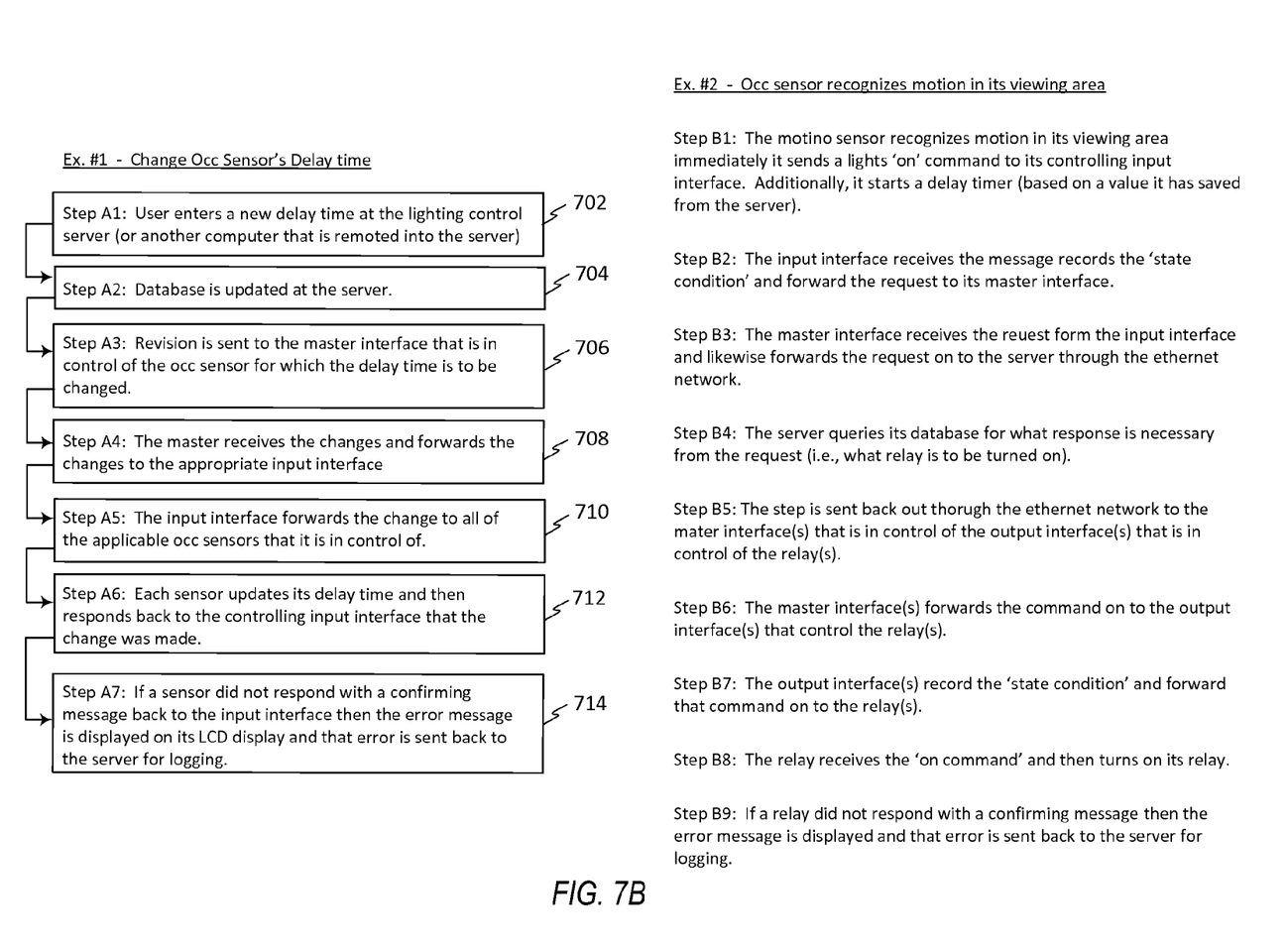
FIG. 7B is an illustration of acts implementing embodiments of both ambient light and motion sensing systems.

FIGS. 7A and 7B illustrate a flow diagram of an example communication between the occupancy/ambient light device 155 and server 630 whereby the "delay time" can be reprogrammed and/or changed. In FIG. 7B, at block 702 (step A1), the user can enter a new "delay time" at the lighting control server 630 or any other computer (not shown) that can remote link into the server 630. The database of these settings which resides on the server 630 can be updated at block 704 (step A2). At block 706 (step A3), the new "delay time" can be sent through the Ethernet link 670 to the appropriate master interface 640. At block 708 (step A4), the master interface 640 can receive and then forward the requested change through the primary link 660 to the appropriate input interface 620. At block 710 (step A5), the input interface 620 can then forward the change through the secondary link 650 to all of the appropriate input devices 155 under its control. At block 712 (step A6), each affected device 155 can then update and store the new "delay time" and confirm the change was made back to its controlling input interface 620. At block 714 (step A7), it is noted that, if any of the affected devices 155 do not respond with a confirming message, an error message can be sent to and logged on the input interface LCD 680 and the error message can also be sent back through the master interface 640 to the server 630 for logging. Communications between the control system components is further described herein below.

The occupancy/ambient light device 155 can be capable of communicating its current state, and the voltage level at that component, back to the lighting control server 630 and to its controlling input occupancy/ambient light interface 620. The current state and voltage level of device 155 can be reported to the user both at the input interface LCD 680 of the input interface 620, which can be located generally nearby the device 155, as well as at the lighting control server 630.

It is noted in the example shown, the occupancy/ambient light devices 155 may not typically each have their own touch screen LCD display as this can greatly increase their cost, physical size and negatively impact aesthetics. Additionally, the occupancy/ambient light devices 155, can typically be located and mounted up high on a window wall, therefore, a touch screen and/or a LCD display mounted directly thereon may not be practically useable and can unnecessarily add to the cost. Instead, occupancy/ambient light devices 155 can be connected via a multi-drop secondary communication link 650 to a controlling input interface 620 having a LCD 680 and where relevant information in connection with the devices 155 is displayed. In this example, a total of sixteen devices 155 are allowed to be connected to each interface 620 and all information in connection with all sixteen devices 155 is displayed on the controlling interface 620. In this manner, the user/installer can be provided with a manner of getting local/nearby setup and status information of each device 155 while the system cost is minimized. It is noted also that because the occupancy/ambient light devices 155 contain an ambient light sensor 530 that is, as described herein, capable of self-adjusting its sensitivity setting, it is possible to fairly easily identify the device 155 and the input interface 620 and, thus, on the control system 600.

That is, pointing a flashlight or otherwise providing another light source at the device sensor 530 can cause a spike in the light intensity reading of the device sensor 530. As further described herein below, using this phenomenon/procedure, the spike can be observed at the controlling input interface 620 LCD 680 for setting up and identifying the input device 155 on the multi-drop secondary link 650.

Packaging Hardware

Figure 8:
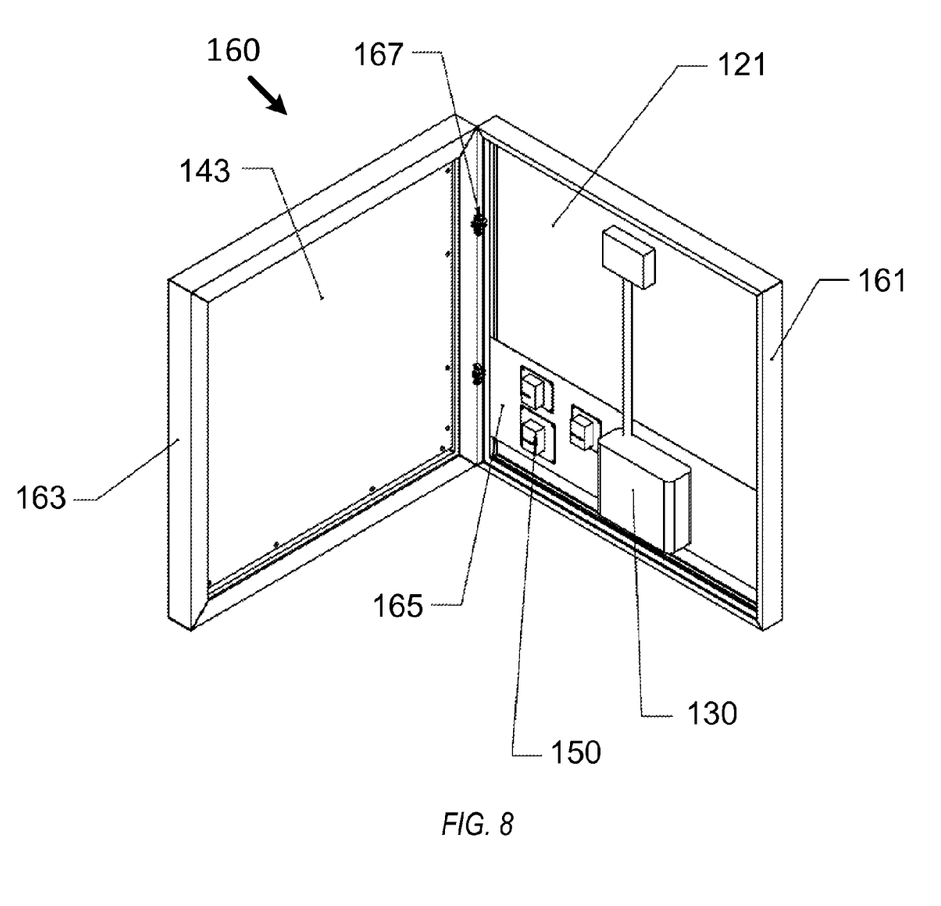
FIG. 8 is an isometric view of an embodiment of an IIS unit in an open configuration.

As shown in FIG. 8, the packaging hardware, frame or other mount 160 can integrate the IIS 100 components into a convenient, standalone plug-and-play module suitable as structural components for incorporation into commercial, industrial, and residential construction. The packaging hardware, frame or other mount 160 can comprise several components including a PV block 161, a lighting block 163, a mounting plate 165 and one or more hinges 167 and one or more frame extenders or other mount extenders. In an example, the PV block 161 can include a solar panel 121. In an example, the lighting block 163 includes an artificial lighting element 143.

Mount extenders can provide a locating or wedging force such as to removably place or secure a first object against a second object. In an example, mount extenders can include jack screw mechanisms, scissor jack mechanisms or other mechanisms that expand in at least one direction to apply force to two surfaces. In an example, mount extenders can be attached to the mount, integral to the mount or separate from the mount.

FIG. 8 shows one embodiment of the IIS 100 in an open configuration where the PV block 161 and the lighting block 163 are separated from each other. In a closed configuration, the PV block 161 and the lighting block 163 can be in intimate contact with one another and form a box-like unit. The ability to open the packaging hardware, frame or mount 160 can allow for convenient maintenance and service of all IIS 100 components.

In an example, the PV block 161 can incorporate a layer of double or triple pane glass to insulate an interior building space (defined as the space adjacent to the lighting block 163, such as a room or office) from an exterior building space (defined as the space adjacent to the PV block 161, such as an outdoor space). In an example, the PV block 161 can incorporate one or more temperature management features such as one or more vents, one or more fans or one or more heaters such as to maintain a desired temperature within the space formed by the PV block 161 and the lighting block 163 when the module is in the closed configuration so as to improve IIS 100 operational efficiency and life. In an example, the PV block 161 is opaque to prevent light from passing through the PV block 161 to the lighting block 163. In an example, the PV block 161 is substantially opaque to prevent most light from passing through the PV block 161 to the lighting block 163.

Figure 9:
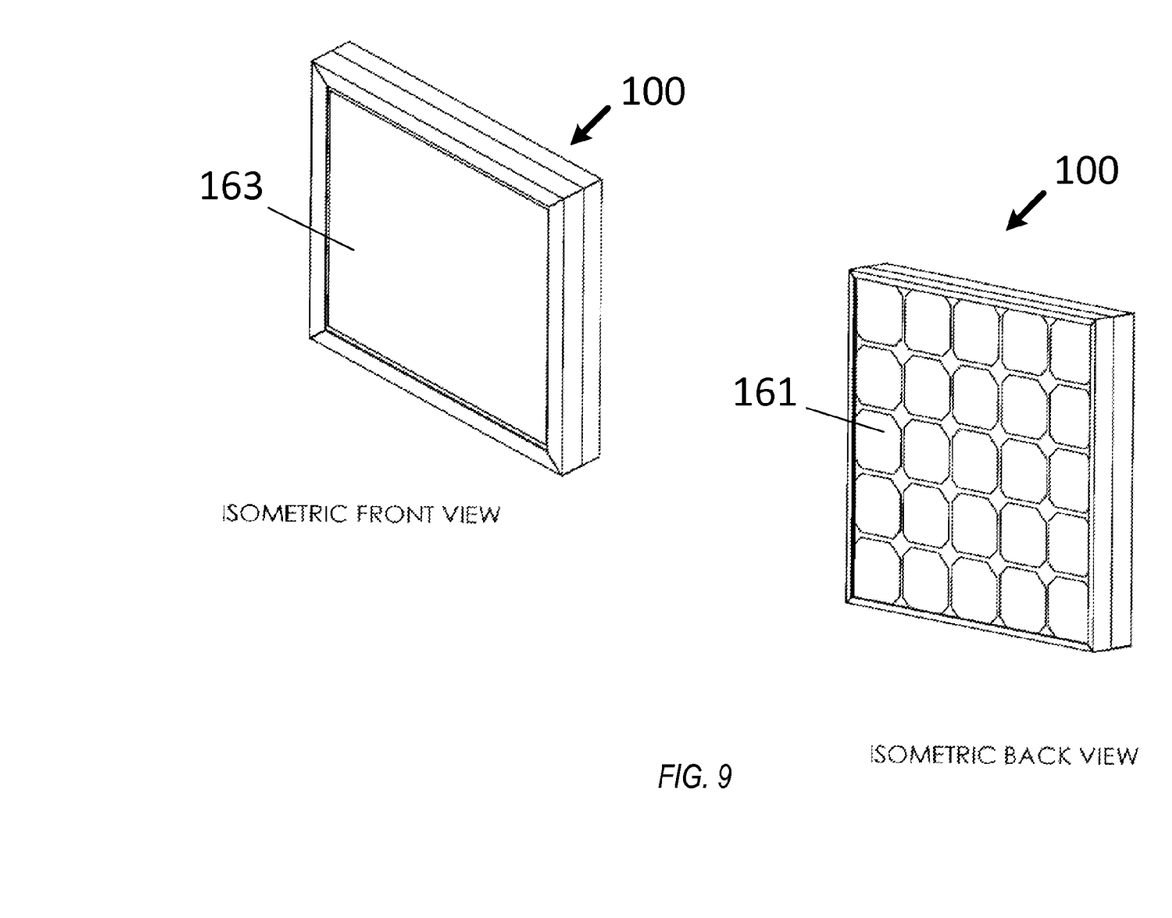
FIG. 9 is an isometric view of the front and back of an embodiment of an IIS unit.

FIG. 9 shows an isometric front view (lighting block 163 side) and an isometric back view (PV block 161 side) of an embodiment of the IIS 100 unit in a closed configuration.

Figure 10:
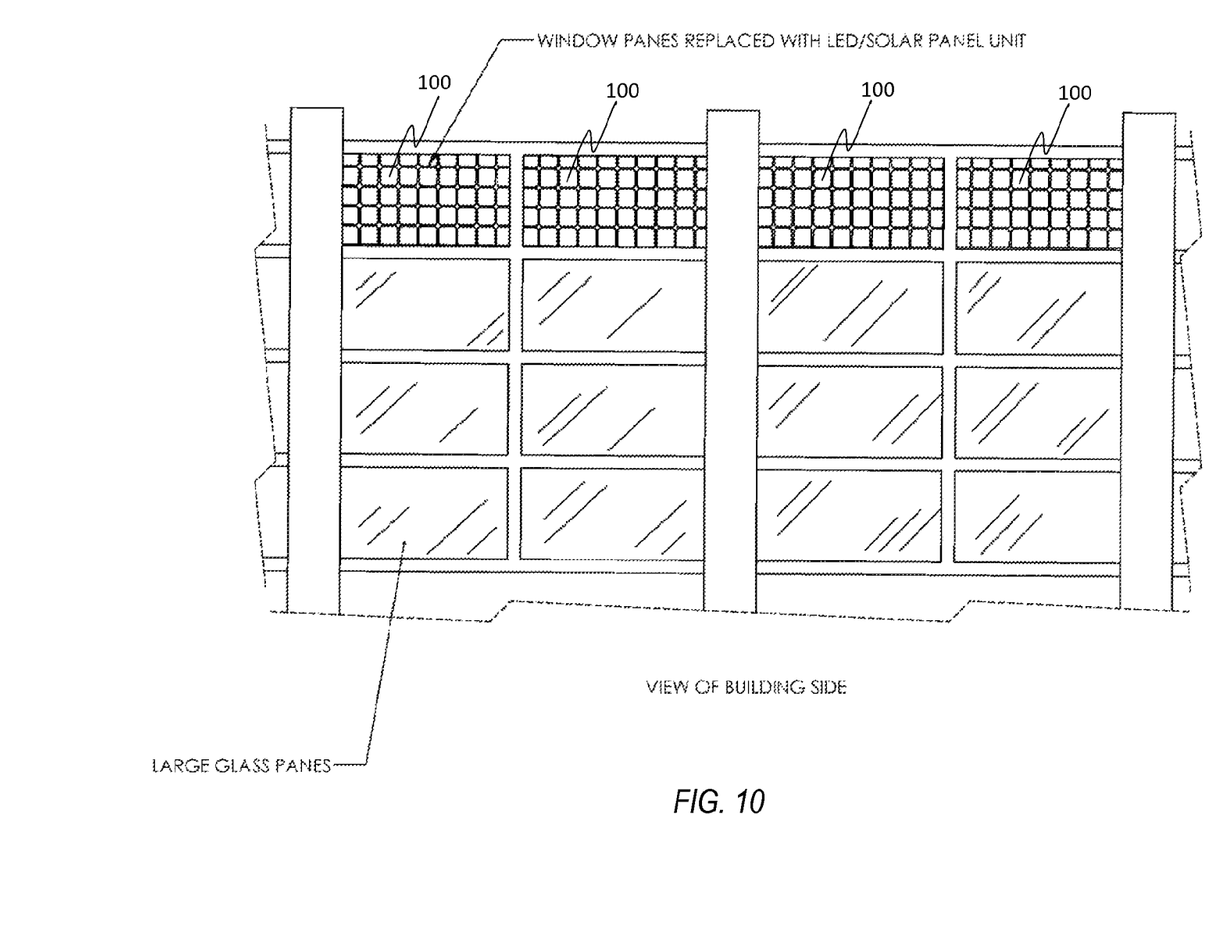
FIG. 10 is an elevation view of a building having several IIS units installed at existing window units.

FIG. 10 shows an example of an outside building wall with several IIS 100 units installed. In an example, the IIS 100 units are installed at an elevation sufficient to allow for solar energy collection, yet provide a clear view outside for occupants of the building. In an example, multiple IIS 100 units can be communicatively coupled to a master controller to coordinate the delivery of artificial light into an area. In an example, a light sensor can be located within the area illuminated by artificial light to coordinate delivery of a specified amount of artificial light within the area.

In an example, an embodiment of the IIS 100 can include an integrated light energy collection and artificial lighting apparatus and can include at least one solar energy collection module; at least one energy storage unit configured to store solar energy collected by the solar energy collection module, at least one lighting module, at least one system control unit, and packaging hardware made of materials including but not limited to metal and polymers, in which to mount the solar energy collection module, the energy storage unit, the lighting module, and the system control unit into a unitary package.

In an example, the IIS 100 is a unitary package providing out of box readiness for standard and custom products. In an example, the integrated illumination system incorporates integrated installation mounting, securing hardware which may include spring loaded "spring jacks", twist locked "screw jacks" extenders or other similar hardware which allows secure installation into variable sized existing external sun exposed openings of structures. In an example, an IIS 100 in a unitary package includes where the packaging can be configured to allow the IIS 100 to be built into traditional window and skylight openings in new construction in support of Net Zero Energy building initiatives and LEED efforts driving a reduction in the window-to-wall (WWR) ratio to less than 40%.

In an example, an IIS 100 in a unitary package can include lighting module source intensities and wavelengths including far-red 735 nm and others such as 460-730 nm can be configured for greenhouse applications, to extend growing hours with reduced consumption of utility generated electricity. In an example, the IIS 100 in a unitary package when installed can replace or fully or partially cover an existing window or skylight. Design allows large area PV module (solar) collection one-to-one sized matched with a large area lighting panel in a unitary package.

In an example, embodiments, such as a 2'×2' system can provide 100 foot candles of light, meeting or surpassing IESNA illumination requirements for detailed-oriented tasks. In an example, the IIS 100 in a unitary package maximizes energy collection and storage as the energy storage unit is integrated within (internal) PV module and lighting panel. In an example, embodiments such as a 2'×2' system, can be configured to store kilowatt hours (kWh) of power limited only be overall unitary system internal compartment volume and selected storage technology. In an example, the IIS 100 in a unitary package can include at least one transformer unit to produce visible light using, in part, utility-supplied electrical power when solar energy is not sufficient to provide full battery charge. In an example, utility-supplied AC connected back-up power option in addition to the DC PV module power can be utilized when solar power is insufficient, with such operation being automatic or user defined. In an example, AC connected back-up power can be hard wired or can have male connector, or other such quick connect hardware on the unit. In an example, the IIS 100 in a unitary package can include packaging hardware fabricated with organic and inorganic materials to meet application environmental (heat, chemical, etc.), weight, aesthetic or other application specific requirements. In an example, the IIS 100 in a unitary package can include lighting panels where the lighting element can use LED technology in the form of stripes, fluorescent tubes, down-lights, light bulbs, light modules, panel lights or 'wall washers'. In some examples, the lighting element can use light diffusers to achieve more uniform light emission. In some examples, lighting elements can be configured into a linear array and integrated together with a diffuser material to improve illumination performance while minimizing power consumption. In some examples, LED panels can be created utilizing different technologies, colors, intensities, wavelengths and size one-to-one matched with PV module size and matched with the application. In some examples, the IIS 100 in a unitary package can include the module controller of this disclosure can use suitable master control unit technologies to manage, control and optimize the IIS 100. In some examples, various embodiments can incorporate Bluetooth to communicate with one or more units via a smartphone application to monitor and control all functions. In some examples, various embodiments link units to home/building automation and security systems thru Ethernet, Wi-Fi, RS-485 networking standards and/or building illumination head controllers. In some examples, various embodiments contain programmable operational parameters to reduce energy consumption and optimize user defined parameters. In some examples, the system control unit of the IIS 100 is configured to allow a user to adjust one or more illumination properties of the lighting module.

Closing Notes

The present integrated illumination system and related method can be incorporated into new construction or retrofit into old construction to improve overall lighting energy efficiencies of buildings, while providing thermal and acoustic insulation and reduction in CO2 emissions. The integrated illumination system and method can be configured for efficient inter-modular connection and can compensate for shading, a problem that can impair performance of series-connected solar panels in articulated applications like building enclosures. The integrated illumination system and method can be used with existing electrical infrastructure to provide a building with access to consistent, reliable illumination.

The above Detailed Description includes references to the accompanying drawings, which form a part of the Detailed Description. The drawings show, by way of illustration, specific embodiments in which the present integrated illumination system and related method can be practiced. These embodiments are also referred to herein as "examples."

The above Detailed Description is intended to be illustrative, and not restrictive. For example, the above-described examples (or one or more elements thereof) can be used in combination with each other. An example can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, an assembly, system, or method that includes elements in addition to those listed after such a term in a claim are still deemed to fall within the scope of that claim. Moreover, in the following claims, the terms "first," "second," and "third," etc., if used, are merely used as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

What is claimed is:

1. An integrated light energy collection and artificial lighting system, the system comprising:
    an integrated light energy collection and artificial lighting apparatus, comprising:
        a unitary assembly, comprising:
            a light energy collector, including a face that is located or arranged to be exposed to receive incident light energy and to convert the received incident light energy into electrical energy;
            an artificial lighting panel, including a face that is located or arranged to deliver artificial light away from the light energy collector,
            wherein the light energy collector is opaque and is located or arranged to preclude any of the incident light from reaching the artificial lighting panel;
            a controller circuit, arranged and communicatively coupled to the light energy collector and the artificial lighting panel of the integrated solar light energy collection and artificial lighting apparatus, wherein the controller circuit is arranged or otherwise configured to coordinate artificial light delivered by the artificial lighting panel to provide a specified amount of the artificial light at a location within a room within a building structure;
            an electrical energy storage unit, coupled to the controller circuit and to an electrical energy output of the light energy collector of the integrated solar light energy collection and artificial lighting apparatus; and
        a light sensor, arranged or otherwise configured to be located within the room of the building structure, wherein the light sensor is communicatively coupled to the controller circuit to provide a feedback signal used by the controller circuit to coordinate the artificial light delivered by the artificial lighting panel to provide a specified amount of the artificial light at the location within the room within the building structure.

2. The system of claim 1, wherein the unitary assembly includes:

a mount, to which the light energy collector and the artificial lighting panel are coupled; and a mount extender, attached to the mount, the mount extender arranged to locate the mount within an opening in a building structure.

3. The system of claim 1, wherein the controller circuit is arranged or otherwise configured to switch the artificial lighting panel between battery powered mode and utility grid powered mode.

4. An integrated light energy collection and artificial lighting system, the system comprising:
    multiple instances of the integrated solar light energy collection and artificial lighting apparatus; the integrated light energy collection and artificial lighting apparatus, comprising:
    a unitary assembly, comprising:
        a light energy collector, including a face that is located or arranged to be exposed to receive incident light energy and to convert the received incident light energy into electrical energy;
        an artificial lighting panel, including a face that is located or arranged to deliver artificial light away from the light energy collector; and
        wherein the light energy collector is opaque and is located or arranged to preclude any of the incident light from reaching the artificial lighting panel;
    a master controller circuit, arranged and communicatively coupled to at least two of the multiple instances of the integrated solar light energy collection and artificial lighting apparatus to coordinate artificial light delivered by at least two of the multiple instances of the integrated solar light energy collection and artificial lighting apparatus to provide a specified amount of the artificial light at a location within a room within the building structure; and
    a light sensor, arranged or otherwise configured to be located within the room of the building structure, the light sensor communicatively coupled to the master controller circuit to provide a feedback signal used by the master controller circuit to coordinate the artificial light delivered by the at least two of the multiple instances of the integrated solar light energy collection and artificial lighting apparatus to provide a specified amount of the artificial light at the location within the room within the building structure.

5. A method comprising:
    providing or using an integrated light energy collection and artificial lighting system, the system comprising:
    an integrated light energy collection and artificial lighting apparatus, comprising:
        a unitary assembly, comprising:
            a light energy collector, including a face that is located or arranged to be exposed to receive incident light energy and to convert the received incident light energy into electrical energy;
            an artificial lighting panel, including a face that is located or arranged to deliver artificial light away from the light energy collector; and
            wherein the light energy collector is opaque and is located or arranged to preclude any of the incident light from reaching the artificial lighting panel; and
    supplying a master controller circuit, arranged and communicatively coupled to at least two of the multiple instances of the integrated solar light energy collection and artificial lighting apparatus to coordinate artificial light delivered by at least two of the multiple instances of the integrated solar light energy collection and artificial lighting apparatus to provide a specified amount of the artificial light at a location within a room within the building structure.

6. The method of claim 5, comprising providing the integrated light energy collection and artificial lighting system at a greenhouse.

7. The method of claim 5, comprising switching power to the artificial lighting panel between utility grid power mode and battery power mode.

8. The method of claim 5, comprising providing or using a light sensor to detect light in an area and to control the artificial lighting panel using information provided by the light sensor.

9. The method of claim 5, comprising mounting the unitary assembly within an opening of a building structure, the opening defining an opening area, and collecting solar energy using the entire opening area.

10. The method of claim 5, comprising mounting multiple instances of the integrated solar light energy collection and artificial lighting apparatus within an opening of a building structure, the opening defining an opening area, and collecting solar energy using the entire opening area.

11. The method of claim 5, comprising supplying a light sensor, arranged or otherwise configured to be located within the room of the building structure, the light sensor communicatively coupled to the master controller circuit to provide a feedback signal used by the master controller circuit to coordinate the artificial light delivered by the at least two of the multiple instances of the integrated solar light energy collection and artificial lighting apparatus to provide a specified amount of the artificial light at the location within the room within the building structure.

12. The method of claim 5, comprising supplying a master controller circuit, arranged and communicatively coupled to at least two of the multiple instances of the integrated solar light energy collection and artificial lighting apparatus to coordinate artificial light delivered by at least two of the multiple instances of the integrated solar light energy collection and artificial lighting apparatus to provide a specified amount of the artificial colored light at a location within a room within the building structure.

13. The method of claim 5, comprising supplying a light sensor, arranged or otherwise configured to be located within the room of the building structure, the light sensor communicatively coupled to the master controller circuit to provide a feedback signal used by the master controller circuit to coordinate the artificial light delivered by the at least two of the multiple instances of the integrated solar light energy collection and artificial lighting apparatus to provide a specified amount of the artificial colored light at the location within the room within the building structure.

* * * * *